(12) United States Patent
Kristensen et al.

(10) Patent No.: US 9,787,910 B2
(45) Date of Patent: Oct. 10, 2017

(54) METHOD FOR DETECTING LIGHT SOURCES OPERATED IN PULSED MODE

(71) Applicant: Conti Temic microelectronic GmbH, Nuremberg (DE)

(72) Inventors: Steen Kristensen, Lindenberg im Allgaeu (DE); Matthias Zobel, Wasserburg (DE); Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 206 days.

(21) Appl. No.: 14/440,488

(22) PCT Filed: Jan. 24, 2014

(86) PCT No.: PCT/DE2014/200025
§ 371 (c)(1),
(2) Date: May 4, 2015

(87) PCT Pub. No.: WO2014/114294
PCT Pub. Date: Jul. 31, 2014

(65) Prior Publication Data
US 2015/0304539 A1     Oct. 22, 2015

(30) Foreign Application Priority Data

Jan. 28, 2013   (DE) ........................ 10 2013 100 804

(51) Int. Cl.
*H04N 7/18*     (2006.01)
*H04N 5/235*    (2006.01)
(Continued)

(52) U.S. Cl.
CPC .......... *H04N 5/2357* (2013.01); *B60W 30/00* (2013.01); *G06T 7/97* (2017.01); *H04N 5/2353* (2013.01);
(Continued)

(58) Field of Classification Search
CPC ......... G06T 7/97; B60W 30/00; H04N 5/2353
(Continued)

(56) References Cited

U.S. PATENT DOCUMENTS

| 2004/0012692 A1 | 1/2004 | Arazaki |
| 2005/0161588 A1 | 7/2005 | Kominsky et al. |

(Continued)

FOREIGN PATENT DOCUMENTS

| DE | 102005033863 | 1/2007 |
| DE | 102010053197 | 8/2011 |

(Continued)

OTHER PUBLICATIONS

PCT International Search Report of the International Searching Authority for International Application PCT/DE2014/200025, mailed May 9, 2014, 3 pages, European Patent Office, HV Rijswijk, Netherlands.
(Continued)

*Primary Examiner* — Helen Shibru
(74) *Attorney, Agent, or Firm* — W. F. Fasse

(57) ABSTRACT

In a method for detecting light sources operated in pulsed mode using a camera, the camera records a series of images, and the time interval between two successive recordings of individual images is varied while the series of images is recorded.

19 Claims, 1 Drawing Sheet

(51) Int. Cl.
   *B60W 30/00*   (2006.01)
   *G06T 7/00*   (2017.01)
(52) U.S. Cl.
   CPC ..... *B60W 2420/42* (2013.01); *B60W 2550/00* (2013.01); *G06T 2207/10004* (2013.01); *G06T 2207/10144* (2013.01); *G06T 2207/30232* (2013.01); *G06T 2207/30252* (2013.01)
(58) Field of Classification Search
   USPC .................. 348/148; 340/933, 937, 942, 943
   See application file for complete search history.

(56) References Cited

U.S. PATENT DOCUMENTS

| | | | |
|---|---|---|---|
| 2005/0237394 A1 | 10/2005 | Katiblan et al. | |
| 2007/0085996 A1* | 4/2007 | Mangan | A61M 1/3693 356/39 |
| 2009/0072996 A1* | 3/2009 | Schoepp | B60Q 1/1423 340/903 |
| 2009/0309972 A1* | 12/2009 | Tonokawa | B60R 1/00 348/148 |
| 2010/0013928 A1* | 1/2010 | Haug | B60R 1/00 348/148 |
| 2010/0134662 A1* | 6/2010 | Bub | H04N 1/195 348/266 |
| 2011/0221929 A1 | 9/2011 | Miyahara et al. | |
| 2015/0253198 A1* | 9/2015 | Bergen | G06K 9/00825 250/206.1 |

FOREIGN PATENT DOCUMENTS

| | | |
|---|---|---|
| EP | 1 276 317 | 1/2003 |
| JP | 06-209427 A | 7/1994 |
| JP | 2012-023459 | 2/2012 |
| WO | WO 2011/091785 | 8/2011 |

OTHER PUBLICATIONS

PCT International Preliminary Report on Patentability including English Translation of PCT Written Opinion of the International Searching Authority for International Application PCT/DE2014/200025, issued Jul. 28, 2015, 8 pages, International Bureau of WIPO, Geneva, Switzerland.

German Search Report for German Patent Application No. 10 2013 100 804.6, dated Oct. 7, 2013, 5 pages, Muenchen, Germany, with English translation, 5 pages.

* cited by examiner

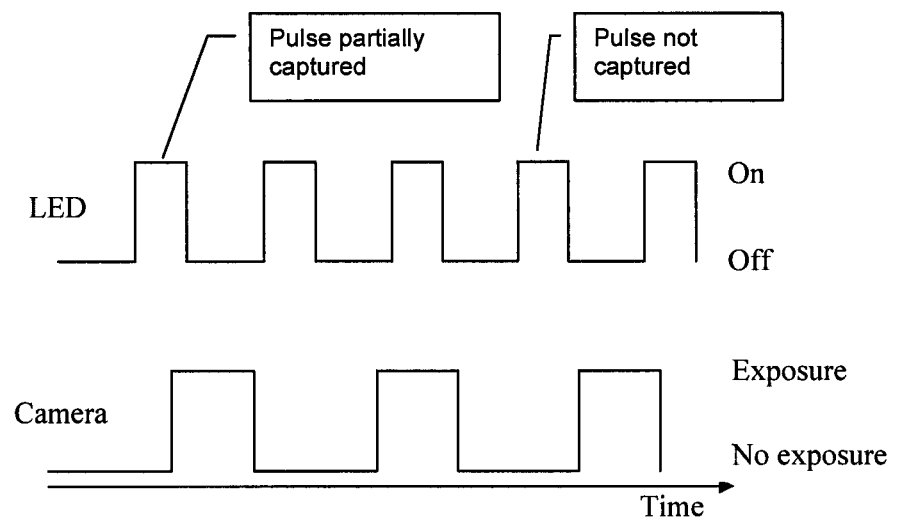

METHOD FOR DETECTING LIGHT SOURCES OPERATED IN PULSED MODE

FIELD OF THE INVENTION

This invention relates to a method for detecting light sources operated in pulsed mode using a camera, which can in particular be used in camera-based driver assistance systems.

BACKGROUND INFORMATION

Automatic camera-based driver assistance systems capture the vehicle surroundings using at least one camera, interpret the image data obtained, and use it to determine a system-specific response from it. Interpretation of the vehicle surroundings includes the detection of luminescent or illuminated elements of the infrastructure or of road traffic. Examples are traffic lights, traffic signs, headlights, and tail lights.

Use of LEDs (light-emitting diodes) instead of light bulbs as lamps presents a greater challenge to camera-based driver assistance systems. Such LEDs are typically not operated continuously but switched on and off in pulsed mode. This means that they are not constantly lit but emit a rapid sequence of light flashes which, due to the slowness of the human eye, is perceived as constant lighting. Such pulsed light sources or light sources operated in pulsed mode can be problematic for camera-based driver assistance systems. One effect can be that the individual images taken by the camera(s) do not show all the information the human eye perceives as illuminated but just parts of it or, in extreme cases, none of it.

Document WO 2011/091785 A1 shows a highly dynamic image sensor for detecting modulated light. The number of charge carriers that can be collected by the pixels of the image sensor can either be reduced or increased starting from an initial number, for example by switching capacitors or resistors provided for that purpose on or off.

In such a solution however, the hardware and control of the image sensor have to meet special requirements, making it more expensive than a standard image sensor that is already used in driver assistance cameras.

SUMMARY OF THE INVENTION

In view of the above, it is an object of at least one embodiment of the invention to provide a method for detecting sources of information or light sources operated in pulsed mode, which facilitates complete and reliable recognition of the information content of these sources in a reliable and cost-efficient manner.

The above object can be achieved in a method according to an embodiment of the invention as set forth herein.

The solution is based on the following considerations regarding the cause of the problem described.

A pulsed mode is typically designed as pulse-width modulation and has two parameters, the pulse rate and the duty cycle, wherein a duty cycle of 50% means that the LED is on 50% of the time. The pulse rate is typically fixed in a given system. The duty cycle is used to control the lamp output in such lighting systems, which sets the brightness of the light.

Driver assistance cameras typically take images or scan the vehicle surroundings also based on a fixed time pattern, e.g. every 40 ms, that is, in a pulsed manner.

As such systems typically use an optical system with a fixed focal length and aperture, the exposure time is available for controlling the image quality, allowing to regulate the quantity of light that is absorbed while the image is taken.

This means that two pulse sequences come into play when taking images of pulsed light sources or of passive infrastructure elements (e.g. reflective objects) that are illuminated by a pulsed light source using a conventional driver assistance camera. The outcome of these two pulsed processes (illumination and taking images) may be that, in an unfavorable combination of the pulse parameters, the illuminated phase of a light source and the image-taking phase occur in such a manner that the light pulse falls only partially into the time window in which the image is taken, and the image is not taken at full brightness. In the worst case, the two processes are so displaced relative to one another that there is no light pulse at all in the time window in which the image is taken, and the driver assistance system cannot derive any information or may derive incorrect information. For example, a red traffic light could be registered as not lit, which could result in an incorrect system response.

The pulsed lighting and the pulsed image-taking thus result in oscillating effects in the recorded signal. The beat period can be from 0 to infinite, in the worst case.

Since elements in the surroundings of a vehicle usually are in the range of detection of a driver assistance camera for only a short period of time, it is important for correct detection that the beat period is kept as short as possible.

This application discloses a method in which beat periods that occur as a result of the lighting and image-taking methods mentioned above are kept short.

The main problem is that the pulse rate and duty cycle of the lighting are not known to the camera control unit. It can be assumed, however, that these parameters are approximately constant for the time in which the infrastructure element is in the camera's range of detection.

The method of the invention is based, inter alia, on the idea that longer beat periods can be avoided if the image-taking rate, unlike the lighting frequency, is constantly varied.

A method according to an embodiment of the invention for detecting light sources operated in pulsed mode or objects (e.g. retroreflectors) that are illuminated using a pulsed light source by means of a camera is therefore characterized in that the camera takes or records a series of images, wherein a time interval between two subsequent or successive takes or recordings of individual images is constantly varied while the series of images is taken i.e. recorded.

The method according to the abovementioned embodiment of the invention can further have the advantage that no assumptions regarding the frequency or duty cycle of light sources operated in pulsed mode are required. Said variation of the time interval between two successive image recordings ensures that light sources operated in pulsed mode are completely detected and recognized from a small number of camera images taken one after the other. This also ensures that future sequences of lighting pulses not known at the time of this application for light sources operated in pulsed mode will not result in long beat periods.

According to an advantageous further development of the invention, the time interval between two subsequent takes of individual images is constantly varied while the series of images is taken. The time until the camera's next image-taking or exposure is therefore displaced with each new image taken.

In a preferred embodiment, the constant variation of the time interval is periodical, i.e. according to a recurring pattern.

Advantageously, the time interval can be varied in such a manner that the sum total of displacement time, image-taking/exposure time, and non-image-taking/non-exposure time is constant for each image. This keeps the "superordinate image-taking rate" of the camera constant, which is favorable from a system point of view. A non-exposure phase following an exposure phase shortens at constant exposure times to the same extent to which the exposure start time is displaced due to variation (relative to a non-displaced exposure start time).

The displacement is just inserted locally into the time pattern, as it were. This results in "jittering" of the start time of exposure, and, with a constant exposure duration, also of the exposure end time.

It is preferred that the possible displacement steps of the time of exposure relative to a predetermined time of exposure while taking the series of images are distributed randomly. The possible displacement steps may preferably be in a displacement time interval that includes the range from a minimum to a maximum displacement.

According to an advantageous embodiment, the possible displacement steps of the time of exposure relative to a predetermined periodic time of exposure while taking the series of images are distributed uniformly, i.e. evenly, in a predetermined displacement time interval.

According to a preferred embodiment, the sequence of individual displacement steps of the time of exposure relative to a predetermined periodic time of exposure while taking the series of images can be predetermined by a pseudo-random sequence. The step size can be scaled, particularly in accordance with the maximum displacement divided by the number of elements of the pseudo-random sequence. Since a pseudo-random sequence is selected as parameter for the local time displacement of the times of exposure, inadvertent synchronization of lighting operated in pulsed mode and camera shooting is reliably excluded.

The camera is advantageously disposed in a vehicle and can capture the vehicle surroundings. The camera can preferably provide data for a driver assistance system which performs one or more functions that support a driver during his or her driving activities. Relevant driver assistance functions include traffic sign recognition, speed limit alert, yield alert, wrong way warning, automatic lighting control, forward collision warning, and adaptive cruise control (ACC).

In a preferred embodiment of the invention, the time interval between two subsequent takes of individual images only begins to vary while the series of images is taken if it has been determined from image data of the camera or from map information that there are potentially relevant light sources operated in pulsed mode in the camera's range of detection. This means that the camera can be operated at a constant time interval between two subsequent takes of individual images (i.e. a fixed shooting rate) in normal operation as long as no potential light sources operated in pulsed mode are detected and determined. Prior knowledge about typical geometries, frames or positional arrangements of relevant light sources operated in pulse mode can be taken into account, e.g. from an object detection based on the (same) camera images. The presence of potentially relevant light sources in pulsed mode in the range of detection of the camera can preferably be determined from navigation/map information. At least some positions of traffic lights, variable message signs, etc. are already shown in digital maps today.

The exposure time is preferably increased when it has been determined from image data of the camera or from map information that there are potentially relevant light sources operated in pulsed mode in the camera's range of detection. In particular, exposure time can be increased if detection of the information content of the light source operated in pulsed mode from an image taken at the original exposure time has been unsuccessful.

Relevant light sources operated in pulsed mode may in particular be variable message signs, traffic lights, or road traffic signal systems, the information content of which can be detected and recognized faster or more reliably using the method according to the invention.

Alternatively, or in addition, vehicle lights may be relevant light sources operated in pulsed mode. The detection of headlights and tail lights of other vehicles is particularly important to prevent dazzling of other drivers through automatic light control.

BRIEF DESCRIPTION OF THE DRAWINGS

The invention will be explained in more detail below with reference to a figure and exemplary embodiments.

The single FIG. 1 is a schematic diagram of pulses over time of an LED light source operated in pulsed mode and of the pulsed exposure phases of a camera.

DETAILED DESCRIPTION OF EXAMPLE EMBODIMENTS OF THE INVENTION

An LED that is switched on and off at regular intervals is shown as an example of a light source (upper curve). This pulsed operation is designed as pulse width modulation and has two parameters, the pulse rate and the duty cycle. The duty cycle indicates the percentage of a cycle in which the LED is on. In the example shown, the LED is on less than 50% of the time. The pulse rate is typically fixed in a given system. The duty cycle is used to control the lamp output in such lighting systems, which sets the brightness of the light.

The lower curve shows the development of the exposure phases of a camera over time. In prior art cameras, this development is also based on a fixed time pattern, e.g. a new exposure phase starts every 40 ms at an image-taking rate of 25 Hz. The exposure operation of the camera can therefore also be considered a pulsed operation.

As such systems typically use an optical system with a fixed focal length and aperture, the exposure time is available for controlling the image quality, allowing to regulate the quantity of light that is absorbed when the image is taken.

This means that two pulse sequences come into play when taking images of pulsed light sources using a camera known from prior art. The outcome of these two pulsed processes (illumination and taking images) may be that, in an unfavorable combination of the pulse parameters, the illuminated phase of a light source and the image-taking phase occur in such a manner that the light pulse falls only partially into the time window in which the image is taken, and the image is therefore not taken at full brightness. This is the case for the first LED pulse (counted from the left), which can only be partially captured by the the camera during the first exposure pulse. The fifth LED pulse shown is also captured in part only. The third LED pulse shown is completely captured by the camera. The second and fourth LED pulses of FIG. 1 however are not captured by the camera at all because they occur between the first and second, or the second and third camera exposure pulses, respectively—in a time interval in which the camera does not expose. In the most unfavorable case, both processes can be so displaced relative to one another that no lighting pulse at all falls into the exposure time window. As a result, the driver assistance system may derive no information or incorrect information from the camera images. For example, a red traffic light could be registered as not lit, which could result in a dangerous incorrect system response.

When a method according to the invention is used, the starting time of a camera exposure phase is varied compared to the exposure timing at regular intervals shown in FIG. 1. This variation excludes the case where no lighting signal at all is captured by the camera if the pulse rate of lighting and image-taking is the same.

The varying displacement or jitter time can be selected as a pseudo-random sequence. If, for example, a sequence of the length 16 is used, the jittered exposure times are one after the other displaced as follows relative to the unjittered exposure times:

[1 3 6 10 15 5 12 4 13 7 2 14 11 9 8]*(maximum jitter time)/16

The above sequence is obtained by (s(n) mod 16) wherein $s(n+1)=s(n)+n$ and $s(0)=0$.

Unintended synchronization of the lighting operated in pulsed mode and the camera shooting is reliably excluded by this pseudo-random sequence of uniformly distributed potential displacement times in a predetermined displacement interval.

In another embodiment, the camera is in principle operated in a "standard mode" with equal distances between subsequent exposure start times. The exposure time is varied only when it has been determined from image data of the camera that there are potentially relevant light sources operated in pulsed mode in the camera's range of detection. For example, potential variable message signs can be recognized from camera images using an image analysis process based on typical geometries, frames or positional arrangements of such variable message signs. Alternatively, or in addition, positions of variable message signs may be stored in a digital map, allowing the navigation system with positioning unit to determine if the camera might capture a variable message sign at the current location.

The method comprises the following steps in this case:
1. Take the image
2. Analyze the image with respect to the presence of potential variable message signs
3. If no potential variable message sign is present, calculate the next exposure time as a basic image period, and return to 1
4. Analyze the content of the potential variable message sign based on the current image and, if content is recognized, forward it to the driver assistance function
5. Calculate the next exposure time as a basic image period+jitter time
6. Return to 1

The invention claimed is:

1. A method using a camera for detecting at least one light source operated in pulsed mode or at least one object that is lit by at least one light source operated in pulsed mode, comprising:
using the camera respectively recording a series of individual images, and
varying a time interval between two successive recordings of two successive individual images while the series of individual images is recorded, without using any information regarding a frequency, a pulse rate and/or a duty cycle of the at least one light source.

2. The method according to claim 1, wherein the time interval is constantly or continuously varied.

3. The method according to claim 1, wherein the time interval is constantly or continuously, and periodically, varied.

4. The method according to claim 1, wherein the varying of the time interval comprises time-shifting an exposure time point, and wherein a sum total of a time-shifting time, an exposure duration, and a non-exposure duration is constant for each image.

5. The method according to claim 1, wherein the varying of the time interval comprises time-shifting an exposure time point among possible displacement steps, and wherein the possible displacement steps of the exposure time point relative to a predetermined periodic exposure time point are distributed randomly while the series of individual images is recorded.

6. The method according to claim 1, wherein the varying of the time interval comprises time-shifting an exposure time point among possible displacement steps, and wherein the possible displacement steps of the exposure time point relative to a predetermined periodic exposure time point are uniformly distributed within a predetermined displacement time interval while the series of individual images is recorded.

7. The method according to claim 1, wherein the varying of the time interval comprises time-shifting an exposure time point among possible displacement steps, and wherein a sequence of individual displacement steps of the exposure time point relative to a predetermined periodic exposure time point is prescribed by a pseudo-random sequence while the series of individual images is recorded.

8. The method according to claim 1, wherein the camera is disposed in a vehicle and arranged and configured to detect the surroundings of the vehicle.

9. The method according to claim 1, further comprising evaluating image data from the camera or map information and thereby determining whether there is at least one potentially relevant light source operated in pulsed mode in a range of detection of the camera, and wherein the time interval between two successive recordings of individual images only begins to be varied while the series of individual images is recorded if it has been determined that there is at least one potentially relevant light source operated in pulsed mode in the range of detection of the camera.

10. The method according to claim 9, wherein the exposure time of the camera is increased when it has been determined that there is at least one potentially relevant light source operated in pulsed mode in the range of detection of the camera.

11. The method according to claim 9, wherein the at least one relevant light source operated in pulsed mode represents at least one of traffic signs and/or traffic lights.

12. The method according to claim 9, wherein the at least one relevant light source operated in pulsed mode is selected from vehicle lights, vehicle headlights, or vehicle tail lights.

13. The method according to claim 9, wherein the map information is evaluated to determine from the map information whether the at least one potentially relevant light source is present in the range of detection of the camera.

14. The method according to claim 9, wherein the image data is evaluated by performing object recognition on the image data to recognize whether the image data includes an object representing the at least one potentially relevant light source.

15. The method according to claim 9, further comprising maintaining a constant time interval between successive recordings of successive individual images before it has been determined that the at least one potentially relevant light source is present in the range of detection of the camera.

16. A method of operating a motor vehicle's driver assistance system to acquire images of a scene that includes a pulsed light source or includes an illuminated object that is illuminated by a pulsed light source, said method comprising the steps:
   a) with a camera of the driver assistance system, recording plural successive individual images of the scene during respective successive exposure phases, wherein respective time intervals exist between the successive exposure phases; and
   b) while performing the recording, with a camera control unit of the driver assistance system varying the respective time intervals between the successive exposure phases, without using any information regarding a frequency, a pulse rate and/or a duty cycle of the pulsed light source.

17. The method according to claim 16, wherein:
   the recording is performed with a constant image acquisition rate,
   a respective one of the images is recorded during each one of successive image acquisition periods that each have the same constant duration as one another,
   each one of the image acquisition periods consists of a respective one of the exposure phases, a respective non-exposure phase after the exposure phase, and a respective exposure-start delay displacement phase before the exposure phase, and
   the varying of the respective time intervals comprises varying the respective exposure-start delay displacement phases.

18. The method according to claim 17, wherein the exposure phases each have the same constant duration as one another, and wherein the varying of the exposure-start delay displacement phases causes a respective relative position of a respective one of the exposure phases within a respective one of the image acquisition periods to jitter among successive image acquisition periods.

19. The method according to claim 16, further comprising the steps:
   c) before the step b), while performing the recording, with the camera control unit maintaining a constant time duration of the time intervals between the successive exposure phases;
   d) in the driver assistance system, evaluating the images by performing object recognition to detect whether the pulsed light source or the illuminated object is recognized in the images, or evaluating map data of a digital map to detect whether the pulsed light source or the illuminated object is located in the scene; and
   e) only when a result of the evaluating in the step d) is affirmative, then ending the step c) and beginning the step b).

* * * * *